United States Patent [19]

Herlache et al.

[11] Patent Number: 5,173,065
[45] Date of Patent: Dec. 22, 1992

[54] CONTACT RING ASSEMBLY AND METHOD

[75] Inventors: Russell L. Herlache, Saginaw; Gary L. Stebner, Birch Run, both of Mich.

[73] Assignee: General Motors Corporation, Detroit, Mich.

[21] Appl. No.: 807,324

[22] Filed: Dec. 16, 1991

[51] Int. Cl.⁵ ......................................... H01R 13/415
[52] U.S. Cl. ..................................... 439/741; 29/844; 29/845; 439/15; 439/27
[58] Field of Search ..................... 439/15, 18, 27, 741, 439/883; 29/842, 849, 845

[56] References Cited

U.S. PATENT DOCUMENTS 3,254,169  5/1966  Fuqua ............................. 200/61.34
4,157,654  6/1979  Beauch ................................ 439/15

Primary Examiner—Eugene F. Desmond
Attorney, Agent, or Firm—Saul Schwartz

[57] ABSTRACT

A method of attaching a flat annular contact plate of a horn ring assembly to a flat annular flange of plastic substrate such as a turn signal canceling cam includes the steps of forming deformable tabs on the contact plate perpendicular to the plane thereof, forming slots in the substrate adjacent an inner edge if the annular flange, forming integral plastic shrouds with pockets therein adjacent the slots and perpendicular to the plane of the flange, seating the contact plate agaianst the flange with the deformable tabs projecting through the slots into the pockets on the shrouds, and bending the tabs against the flange to clamp the contact plate to the flange. The pockets hold the shrouds over the bent tabs and prevent spurious electrical contact with the tabs.

5 Claims, 1 Drawing Sheet

CONTACT RING ASSEMBLY AND METHOD

FIELD OF THE INVENTION

This invention relates to a contact ring assembly in a horn circuit on an automotive steering column and to a method of attaching a conductive metal contact ring of the assembly to a nonconductive plastic substrate of the assembly.

BACKGROUND OF THE INVENTION

Horn circuits on automotive steering columns typically include a stationary contact brush and a contact ring assembly having a conductive contact plate on a nonconductive substrate rotatable with a steering shaft of the column. In apparatus described in U.S. Pat. No. 3,254,169, issued 31 May 1966 and assigned to the assignee of this invention, the plastic substrate is a turn signal canceling cam on the steering shaft and the horn contact plate is attached to an annular flange of the cam by a plurality of deformable tabs on the plate bent behind the flange. The bent tabs, however, are exposed from behind the canceling cam and, as a practical matter, must be insulated against spurious contact with other conductive elements of the steering column by an annular insulating gasket adhesively attached to the back side of the flange over the tabs. A contact ring assembly and method according to this invention affords economic advantages relative to prior assemblies and methods by eliminating separate insulating gaskets.

SUMMARY OF THE INVENTION

This invention is a new and improved contact ring assembly and method of making the same including a plastic substrate, such as a turn signal canceling cam, and a flat annular metal contact plate having a plurality of angularly spaced deformable tabs thereon. The plastic substrate has an annular flange with a plurality of angularly spaced slots therein and a corresponding plurality of integral flexible shrouds perpendicular to a back side of the flange adjacent each slot. Each shroud has an integral pocket at its free end facing the corresponding slot. The contact ring seats against the flange on the substrate with the deformable tabs projecting through respective ones of the slots and into the retaining pockets on the shrouds. The tabs and shrouds are bent against the back side of the flange to clamp the contact plate against the flange. The retaining pockets hold the shrouds against the tabs so that the shrouds automatically cover the tabs and prevent spurious electrical contact.

DESCRIPTION OF A PREFERRED EMBODIMENT

Figure 1:
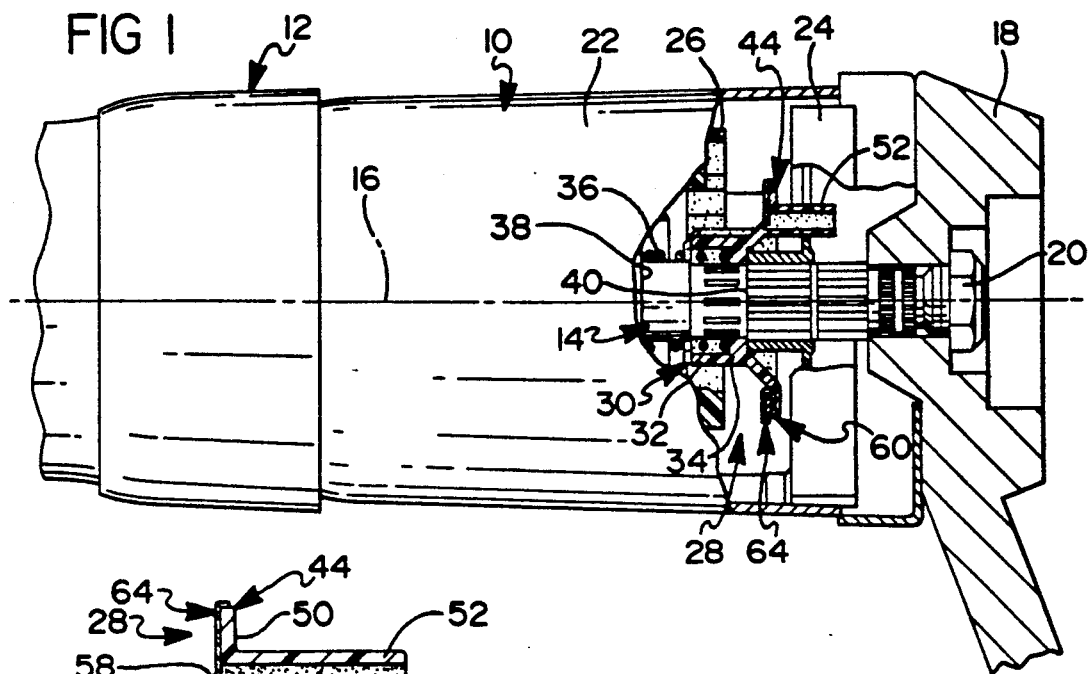
FIG. 1 is a fragmentary, partially broken-away elevational view of an automotive steering column having a contact ring assembly according to this invention.

Referring to FIG. 1, an automotive steering column (10) includes a nonrotatable or stationary mast jacket (12) and a steering shaft (14) supported on the mast jacket (12) for rotation about a centerline (16) of the steering column. A steering wheel (18) is retained on a serrated outboard end of the steering shaft (14) by a nut (20) and rotates as a unit with the steering shaft in the usual fashion. A stationary bezel (22) surrounds the upper end of the steering shaft (14) and conceals an annular housing (24) rotatable with the steering shaft and containing wiring associated with a supplemental inflatable restraint (SIR) system, not shown, on the steering wheel.

As representatively described in the aforesaid U.S. Pat. No. 3,254,169, the bezel (22) also conceals a conventional turn signal switch including an actuator plate (26). The actuator plate is connected to a turn signal lever, not shown, which a driver moves from an off position to either a right turn position or a left turn position to illuminate the vehicle's turn signals. A contact ring assembly (28) according to this invention is disposed on the steering shaft (14) within the bezel (22) between the SIR housing (24) and the actuator plate (26).

Figure 2:
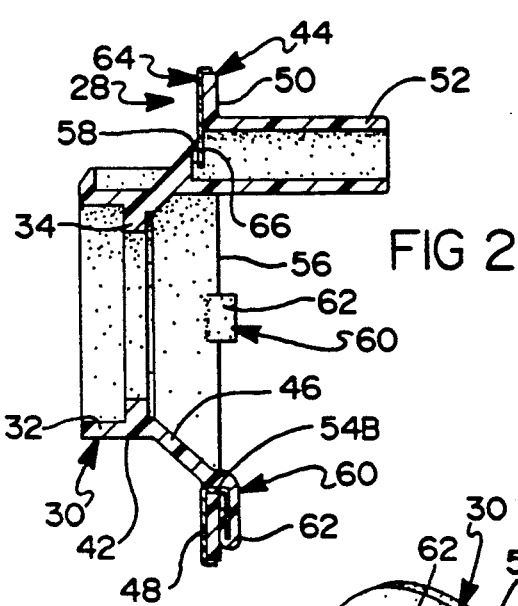
FIG. 2 is an enlarged view of the contact ring assembly according to this invention.
Figure 3:
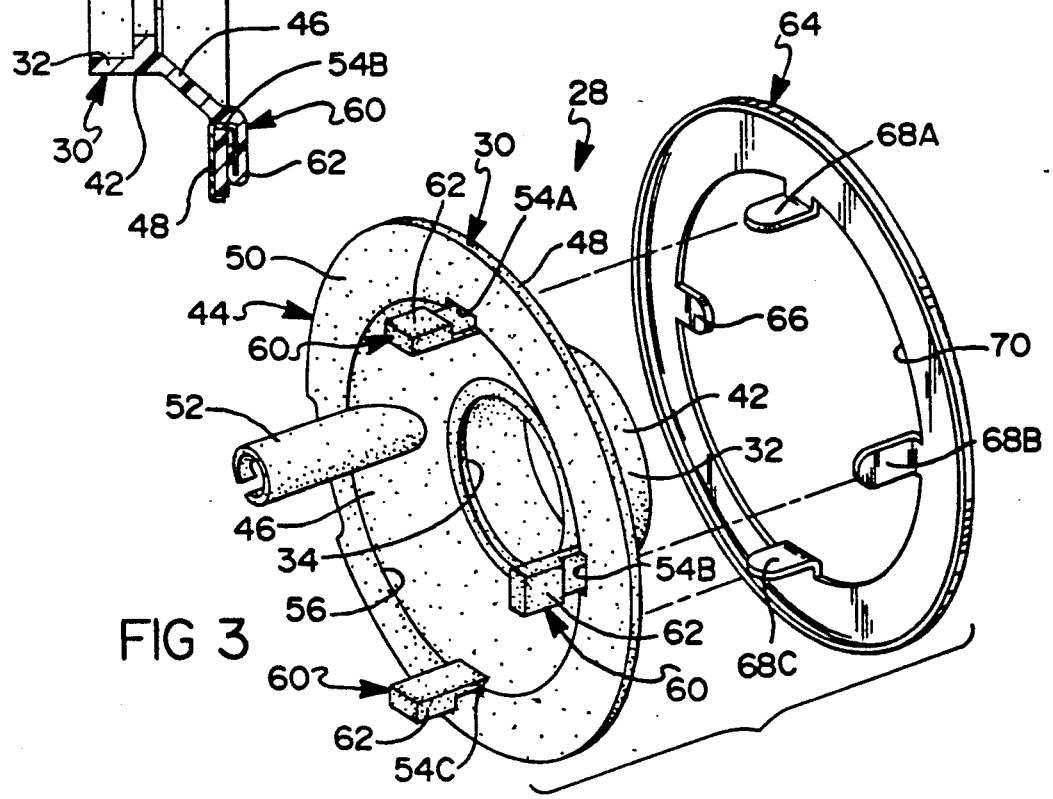
FIG. 3 is an exploded perspective view of the contact ring assembly according to this invention.

Referring to FIGS. 1-3, the contact ring assembly (28) includes a nonconductive substrate in the form of an injection molded, plastic turn signal canceling cam (30). The canceling cam has a generally cylindrical hub (32) and an integral annular web (34) closely received around the steering shaft (14). A coil spring (36) seats against the web (34) and against a shoulder (38) on the steering shaft to bias the web (34) against a second annular shoulder (40) on the steering shaft. The hub may include cams on an outside surface (42) thereof for resetting the actuator plate (26) as described in the aforesaid U.S. Pat. No. 3,254,169.

As seen best in FIGS. 2-3, the canceling cam (30) further includes an integral annular flange (44) connected to the hub (32) by a frustoconical web (46). The flange (44) is disposed in a plane perpendicular to the centerline (16) of the steering shaft and includes a front side (48) facing the actuator plate (26) and a back side (50) facing the SIR housing (24). An integral tubular boss (52) of the canceling cam perpendicular to the flange (44) projects into an appropriate cavity in the SIR housing (24) so that the canceling cam also rotates as a unit with the steering shaft (14).

The canceling cam (30) has a plurality of angularly spaced longitudinal slots (54A-C) therein generally adjacent an inner circular edge (56) of the annular flange (44) and a transverse slot (58), FIG. 2, aligned with the tubular boss (52) and affording access to the interior of the boss from the front side (48) of the flange (44). The canceling cam further includes a plurality of integral flexible shrouds (60) extending perpendicular to the plane of the flange (44) from the back side (50) thereof. The shrouds (60) are located adjacent respective ones of the slots (54A-C) and are generally as wide as the slots. Each shroud (60) has a retainer at an outboard or distal end thereof in the form of a pocket (62) molded integrally with the shroud. Each of the pockets (62) has an open side aligned with and facing the corresponding one of the slots (54A-C).

The contact ring assembly (28) further includes a conductive, flat, annular metal contact plate (64) about the same size as the flange (44). The contact plate (64) has an integral contact tab (66) in the plane of the plate and a plurality of integral deformable attaching tabs (68A-C) perpendicular to the plane of the plate. The tabs (66, 68A-C) are located at an inside edge (70) of the contact plate and are angularly spaced around the inside edge in accordance with angular spacing of the slots (58,54A–C).

In attaching the contact plate (64) to the canceling cam substrate (30) on the front side (48) of the flange (44), the contact plate is indexed to align the contact tab (66) with the transverse slot (58) and the deformable tabs (68A–C) with the longitudinal slots (54A–C), respectively. The contact plate (64) is advanced toward the substrate with a slight offset to insert the contact tab (66) into the transverse slot (58) and each of the deformable tabs (68A–C) into the longitudinal slots (54A–C) until the plate seats against the flange. Concurrently with seating of the contact plate (64), the distal or outer ends of each of the deformable tabs (54A–C) lodge in a corresponding one of the pockets (62) on the flexible shrouds (60).

The contact plate (64) is clamped to the substrate (30) by laterally bending each of the deformable tabs (68A–C) against the back side (50) of the flange (44). Bending force is not applied directly to the deformable tabs but rather to the shrouds (60) because the latter shield the tabs. When the tabs (68A–C) are bent against the back side (50) of the flange, the shrouds (60) cover the corresponding tabs and shield each against spurious electrical contacts from behind the canceling cam.

Within the bezel (22), a contact brush, not shown, of a horn circuit bears against the contact plate to complete the horn circuit from the stationary mast jacket (12) to the rotating contact plate on the steering shaft. An additional contact, not shown, in the tubular boss (52) engages the contact tab (66) at the bottom of the boss and completes a circuit from the contact plate (64) to a horn switch, not shown, on the steering wheel. When a driver depresses the horn switch, the horn circuit is completed and an audible horn signal is produced regardless of the angular position of the steering wheel.

We claim:

1. A method of attaching a flat conductive metal contact plate to a flat nonconductive plastic substrate comprising the steps of:
   forming a permanently deformable metal tab on said contact plate perpendicular to the plane thereof,
   forming a slot in said plastic substrate perpendicular to the plane thereof,
   forming on said plastic substrate a nonconductive flexible shroud adjacent to said slot in said plastic substrate and perpendicular to the plane of said substrate,
   forming on a distal end of said flexible shroud a retaining means,
   seating said contact plate on said plastic substrate with said deformable tab projecting through said slot in said plastic substrate into said retaining means whereby said shroud is flexible as a unit with said deformable tab, and
   bending said deformable tab and said shroud against said substrate to clamp said contact plate to said substrate,
   said retaining means holding said shroud over said deformable tab to shield said deformable tab against spurious electrical contact.

2. The method of attaching a conductive metal contact plate to a nonconductive plastic substrate recited in claim 1 wherein the step of forming on said plastic substrate a nonconductive flexible shroud includes said step of
   forming said flexible shroud integrally with said plastic substrate.

3. The method of attaching a conductive metal contact plate to a nonconductive plastic substrate recited in claim 2 wherein the step of forming on a distal end of said flexible shroud a retaining means includes the step of
   forming on said end of said flexible plastic shroud an integral plastic pocket having an open side aligned with and facing said slot in said plastic substrate.

4. A method of attaching a flat annular metal horn contact plate to a plastic substrate having a planar annular flange corresponding in size to said annular contact plate comprising the steps of:
   forming a plurality of integral deformable tabs on said contact plate adjacent to and angularly spaced around an inside diameter thereof and perpendicular to the plane thereof,
   forming a corresponding plurality of slots in said plastic substrate perpendicular to the plane of said annular flange and adjacent to and angularly spaced around an inside diameter of said annular flange,
   forming on said plastic substrate a plurality of integral flexible plastic shrouds adjacent to respective ones of said slots in said plastic substrate and perpendicular to the plane of said annular flange,
   forming on a distal end of each of said flexible shrouds an integral pocket having an open side aligned with and facing a corresponding one of said slots in said plastic substrate,
   seating said contact plate on said flange of said plastic substrate with each of said deformable tabs projecting through respective ones of said slots into said integral pockets on said flexible shrouds whereby each of said shrouds is flexible as unit a corresponding one of said deformable tabs, and
   bending each of said deformable tabs against said flange on said plastic substrate to clamp said contact plate on said flange,
   said integral pockets holding said shrouds over said deformable tabs to shield said deformable tabs against spurious electrical contact.

5. A contact ring assembly comprising:
   a plastic substrate rigidly attached to a rotatable shaft and including an integral annular plastic flange in a plane perpendicular to a centerline of said shaft and a plurality of slots in said substrate perpendicular to the plane of said annular flange and adjacent to and angularly spaced around an inner edge of said annular flange,
   a flat annular metal contact plate corresponding in size to the size of said annular flange and seated against said annular flange,
   means on said annular contact plate defining a plurality integral deformable tabs adjacent to and angularly spaced around an inside edge of said annular contact plate and projecting through respective ones of said slots in said plastic substrate,
   each of said deformable tabs being bent against said flange on said plastic substrate to clamp said contact plate against said annular flange, and
   means defining a plurality of integral shrouds on said plastic substrate adjacent respective ones of said slots therein each having an integral pocket at a distal end thereof receiving a corresponding one of said deformable tabs whereby said shrouds are held over said deformable tabs to shield said deformable tabs against spurious electrical contact.

* * * * *